(No Model.)
J. G. PERRY.
NUT LOCK AND BOLT TIGHTENER.
No. 482,906. Patented Sept. 20, 1892.
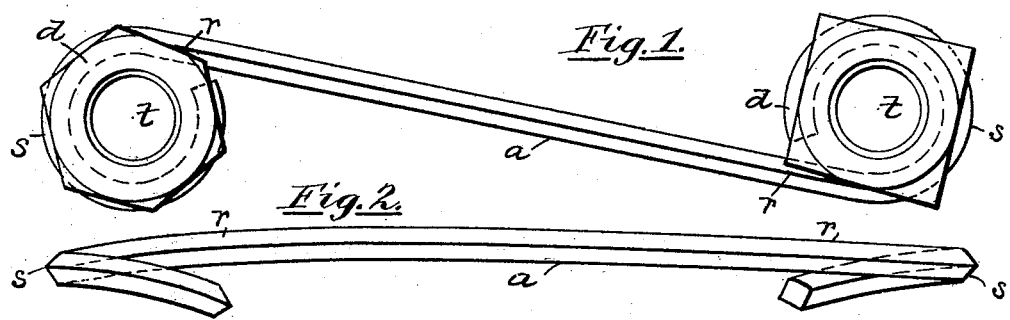
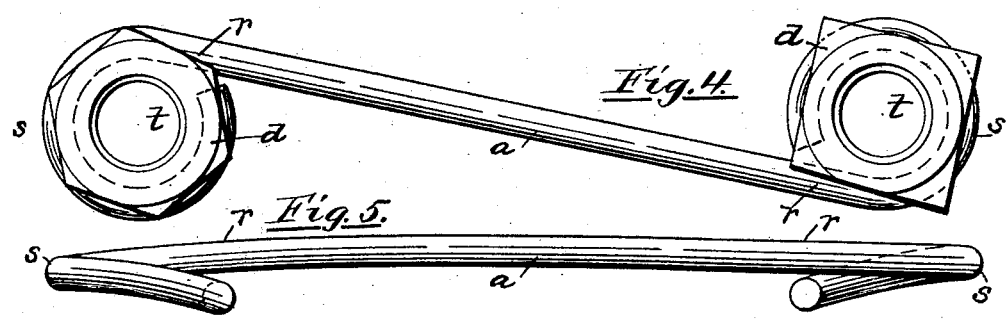
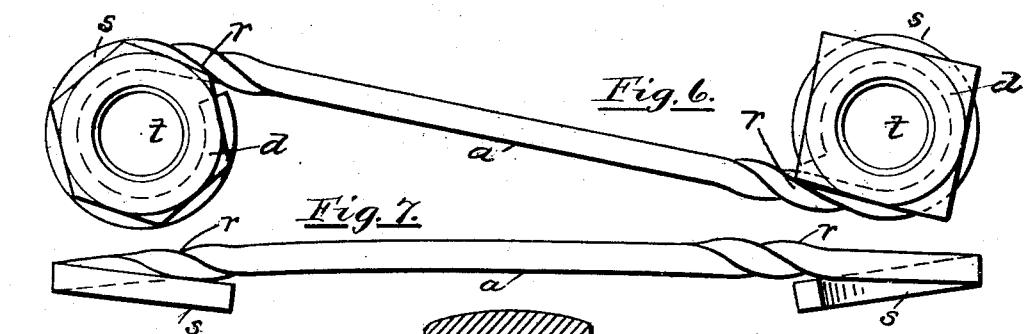
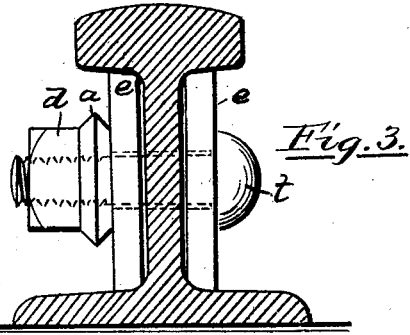
Witnesses:
Charles Hannigan.
M. P. Perry.
Inventor:
John G. Perry.

UNITED STATES PATENT OFFICE.

JOHN G. PERRY, OF WAKEFIELD, RHODE ISLAND.

NUT-LOCK AND BOLT-TIGHTENER.

SPECIFICATION forming part of Letters Patent No. 482,906, dated September 20, 1892.

Application filed February 3, 1892. Serial No. 420,153. (No model.)

*To all whom it may concern:*

Be it known that I, JOHN G. PERRY, a citizen of the United States, residing at Wakefield, in the county of Washington, in the State of Rhode Island, have invented certain new and useful Improvements in Nut-Locks and Bolt-Tighteners, of which the following is a specification, reference being had to the accompanying drawings, making part thereof.

This invention relates to that class of devices called "nut-locks and bolt-tighteners," being for the purpose of locking the nuts and keeping them from unscrewing, becoming loose, and getting off the bolts, and is also for the purpose of keeping the bolts tight and thereby preventing other accidents, and relates especially to the bolts and nuts used to secure railway-rails by means of fish-plates. It is fully described in the accompanying drawings, in which—

Figure 1 is a top view of the nut-lock with two bolts and nuts, one of each of the shapes commonly used—viz., hexagon and square. Fig. 2 is an edge view of the nut-lock without the nuts and bolts. Fig. 3 is a section of the rail showing an end elevation of the nut-lock, nuts, and bolts of Fig. 1 applied with fish-plates to the rail. Fig. 4 is a top view of the nut-lock, made of a bar round in section, with bolts and nuts. Fig. 5 is an edge view of the nut-lock of Fig. 4 separate. Fig. 6 is a top view of the nut-lock slightly modified with bolts and nuts. Fig. 7 is an edge view of the nut-lock of Fig. 6 without the bolts and nuts.

This nut-lock is intended to provide the spring-pressure between the nut and fish-plate *e* necessary to take up any looseness caused by the wearing of the parts or otherwise that the positive pressure of the nut *a* will not but at the same time it does not depend on such spring-pressure to prevent the nut from turning and working off the bolts *t*. It consists, as represented in Figs. 6 and 7, preferably of a rectangular metallic bar *a*, the two ends of which are made into short coils by being turned or bent around to the right or left, or both, either way forming circles at the ends, the centers of which agree with those of the bolt-holes in the rails *n*, and the ends of the bar *s s* are bent down or its other portions bent up, as seen in Fig. 7, to form springs under the nuts *d*. These end circles are then given a turn or twist, each to the right or left, so as to form at the junctions of the rings and straight portions of the bar *a* ridges *r* on the bar *a* with inclined sides over which the edges of the nuts *d*, when nearly screwed up, will not turn either way without the application of a wrench. This positively locks and prevents the nut *d*, when turned up, from being turned back by the working of the parts when trains and heavy loads pass over the rails, and at the same time allows the nuts to be unscrewed when necessary for any purpose by means of a wrench, the inclines on the sides of the ridges *r* in connection with the spring of the bar and cant or spring of the nuts admitting of their edges engaging therewith being forced over them by the wrench. These locks may be put onto the bolts either side out or either edge up or either end to, and in case of the twisted forms shown in Figs. 6 and 7, if the bar is bent, so as to bring the twisted part in under the nut, the increased thickness of the twisted part with the cant of the nut will have a like effect in locking the nut and preventing it from unscrewing and working off the bolt accidentally.

A modification of this device is shown in Figs. 1 and 2, in which the ridges are produced by using the rectangular bar *a*, with one of its corners uppermost instead of taking it flat and twisting it near the ends, as before described. The bar *a* is bent into circles at the ends, as in Figs. 6 and 7. The ridge *r* with inclines on the sides is formed by the upper corner of the bar.

Figs. 4 and 5 show the device formed of a round bar *a*, in which the round top side of the bar forms a semicircular ridge *r*, the sides of which serve the same purpose as the sides of the straight-sided ridges *r* first described—that is, they will prevent the nuts from turning in either direction without the application of a wrench—but with a wrench the edges of the nuts can be forced over the ridges as the straight part of the bar will spring down, and the edges of the nuts engaged therewith will give or spring up sufficiently for that purpose. In each form of the nut-lock shown the end spirals *s s* are compressed into a flat position as near as possible when the nuts are screwed entirely on and these stiff spirals exert a pressure against the nuts to take up all looseness of the bolts caused by wear or otherwise, as before stated.

Having thus described this improvement, I claim—

A nut-lock consisting of a metallic bar having a spring circle at each end and an intermediate section springing up to yieldingly engage the lower edge and corner of the nut, said bar having one or more inclined sloping faces in cross-section over which the corners of the nut will ride and depress the locking-bar when force is applied, substantially as set forth.

JOHN G. PERRY.

Witnesses:
H. T. PERRY,
H. B. PERRY.